Jan. 22, 1924.

L. D. SOUBIER

GLASS FEEDER

Filed Oct. 2, 1922

INVENTOR
LEONARD D. SOUBIER
BY J. F. Rule
HIS ATTORNEY

Jan. 22, 1924.  
L. D. SOUBIER  
GLASS FEEDER  
Filed Oct. 2, 1922

INVENTOR  
LEONARD D. SOUBIER  
BY J. F. Rule  
HIS ATTORNEY

Patented Jan. 22, 1924.

1,481,331

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

GLASS FEEDER.

Application filed October 2, 1922. Serial No. 591,752.

*To all whom it may concern:*

Be it known that I, LEONARD D. SOUBIER, a citizen of the United States, residing at Toledo, in the county of Lucas and State of Ohio, have invented new and useful Improvements in Glass Feeders, of which the following is a specification.

My invention relates to apparatus for delivering individual masses or charges of glass from a tank or pool of glass. More particularly, it relates to a glass feeder of the type in which the glass is delivered through an outlet opening in the bottom of a furnace boot or other receptacle, the discharge being controlled by a vertically reciprocating plug or other regulator. In feeders of this type, considerable difficulty has been experienced on account of chilling and stagnation of the glass in front of the regulator and consequently an unsymmetrical flow of glass through the outlet. The issuing column or gob of glass being colder on one side than the other causes various defects in the finished ware produced therefrom. Attempts to overcome this difficulty by the use of a stationary wall or island behind the regulator for guiding the glass around the latter, have not proved entirely satisfactory.

An object of my invention is to overcome the above difficulty by the provision of adjustable guiding means for directing the flow of glass to and around the regulator, said means being adjustable to meet varying conditions found in practice, such as variations in temperature, level of the glass, rate of discharge, etc.

Other objects of the invention will appear hereinafter.

Figure 1:
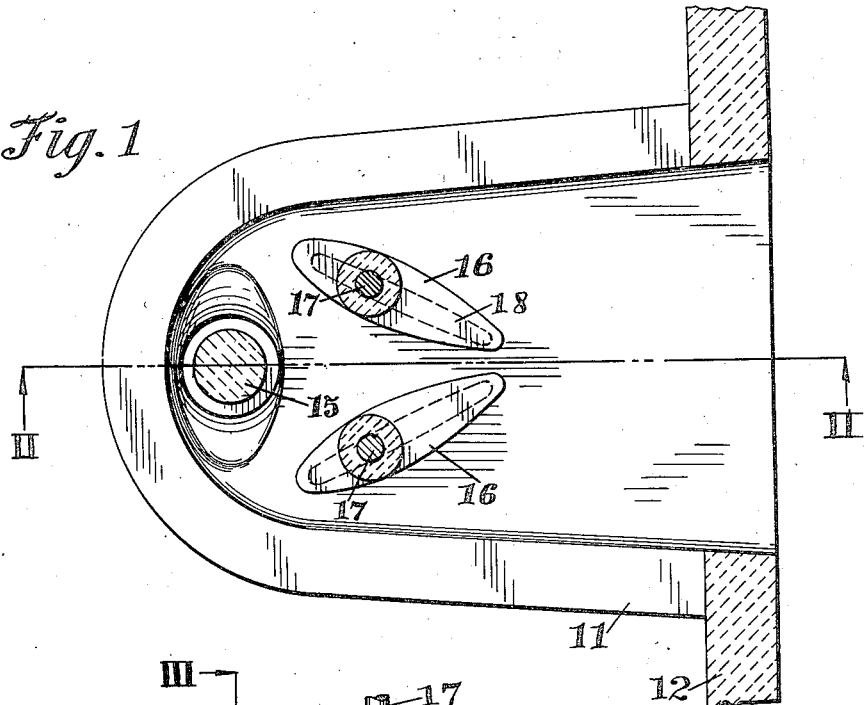
Figure 1 is a sectional plan view of a glass feeder to which my invention is applied.
Figure 2:
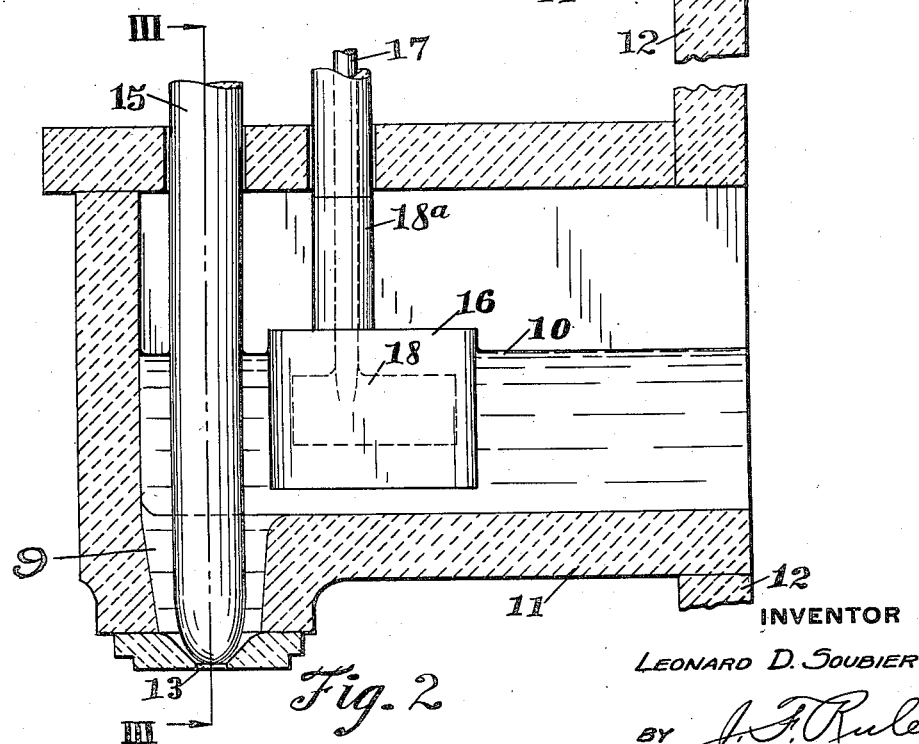
Figure 2 is a sectional elevation of the same at the line II—II on Figure 1.
Figure 3:
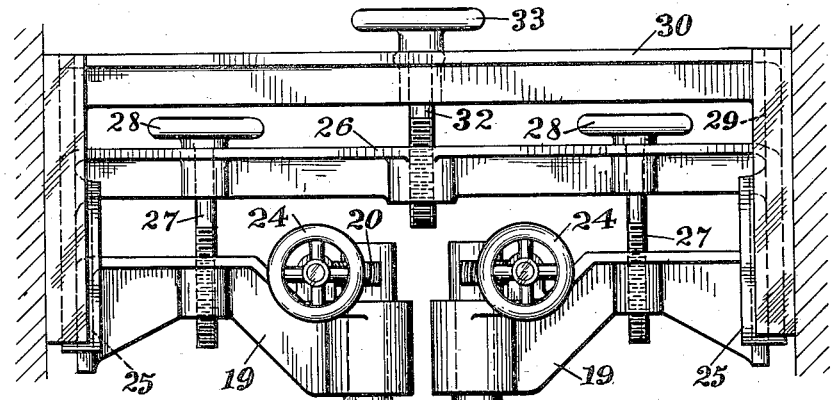
Figure 3 is a front sectional elevation at the line III—III on Figure 2, the regulating plug being omitted.
Figure 3:
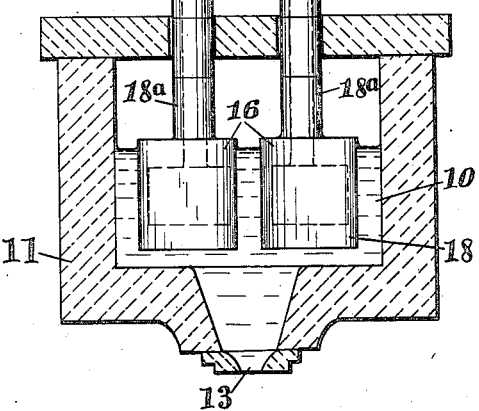
Figure 4:
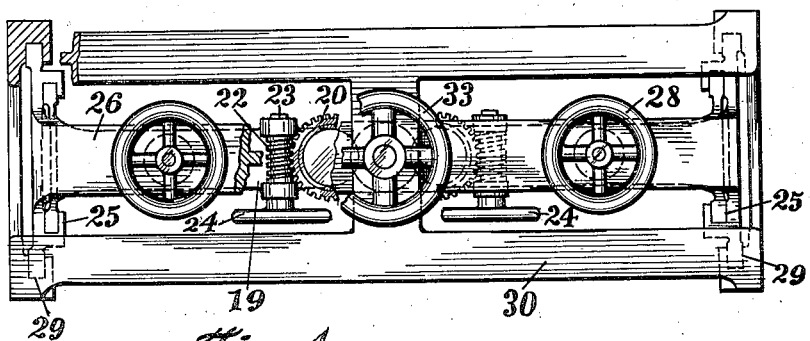
Figure 4 is a plan view, with parts broken away, of adjusting mechanism shown in Figure 3.

The molten glass 10 is supplied to the charger 11 from the main tank or furnace 12. Said charger is herein shown as comprising the usual furnace boot or extension provided with a well 9 in the floor thereof at the forward end of the boot, said well having an outlet opening 13 in the bottom thereof. The discharge of the glass is controlled by a regulator 15 which may be the usual clay plug periodically reciprocated in a vertical direction for alternately exerting expelling and retarding forces on the issuing glass.

As the glass flows forward from the furnace and through the outlet 13, there is a tendency for the glass to issue from the outlet mainly at the rear side of the regulator 15, following the path of least resistance. The glass in front of the regulator is, therefore, comparatively inert and becomes more or less chilled, thereby augmenting the unevenness or onesidedness of the flow. As a result, the issuing charges or gobs of glass are unsymmetrical in shape and temperature, being colder on one side than the other. This lack of symmetry produces unevenness and defects in the finished ware.

In order to overcome this objection and distribute the flow of glass evenly around the regulator 15, I provide a pair of adjustable guides 16 projecting downward into the glass in the boot. Each guide is carried by a vertical metal rod or core 17, at the lower end of which is an enlargement or foot 18 forming a reenforcement for the body 16 which is made of fire clay or other refractory material. Each core 17 is surrounded by a sleeve 18ª of fire clay. The guides 16 are supported by brackets or frames 19 in which the rods 17 are journalled. Attached to each rod 17 near its upper end is a worm gear segment 20 operated by a worm 22 on a shaft 23 journalled in the frame 19 and provided with a hand wheel 24. By rotating either hand wheel 24 the corresponding guide 16 is rotatively adjusted about the axis of its stem 17.

The frames 19 are slidable vertically in guideway 25 formed in the ends of a yoke 26. Adjusting rods 27 journalled in the yoke 26 and having screw threaded connection with the frames 19, are provided with hand wheels 28, whereby either frame 19 may be adjusted vertically independently of the other, thus independently adjusting the guides 16 up or down in the glass. The yoke 26 is adjustable vertically, the ends of said yoke being slidable in vertical guideways 29 provided in a stationary framework 30 which forms a support for the entire mechanism. Adjustment of the yoke 26 is effected by means of a screw rod 32 threaded into the yoke, said rod being journalled in the frame 30 and provided with a hand wheel 33. By rotating the hand wheel 33, the guides 16 are together adjusted up or down.

By adjusting the guides or wings 16 to the Figure 1 position, the greater portion of the glass flowing forward to the outlet is guided along the outer faces of said guides and thus directed towards the forward side of the regulator 15. By properly adjusting the guides 16, a uniform distribution of the issuing glass around the regulator may be effected. In practice, there is sometimes a tendency for the glass to flow forward around one side of the regulator more freely than the other side, thereby causing an unsymmetrical discharge. This difficulty may be overcome with the use of my invention by adjusting one of the wings 16 at a greater angle than the other. By adjusting the wings vertically in the glass, the amount of glass flowing forward beneath said wings to the outlet without being laterally deflected by said wings, may be regulated and controlled. In this manner, a greater or less proportion of the issuing glass may be drawn from the substrata or glass beneath the surface, rather than from the surface layers of glass. This also forms a convenient means for quickly adjusting and controlling the temperature of the issuing glass, as the glass near the floor of the boot is usually at a different temperature than that at or near the surface.

Figure 5:
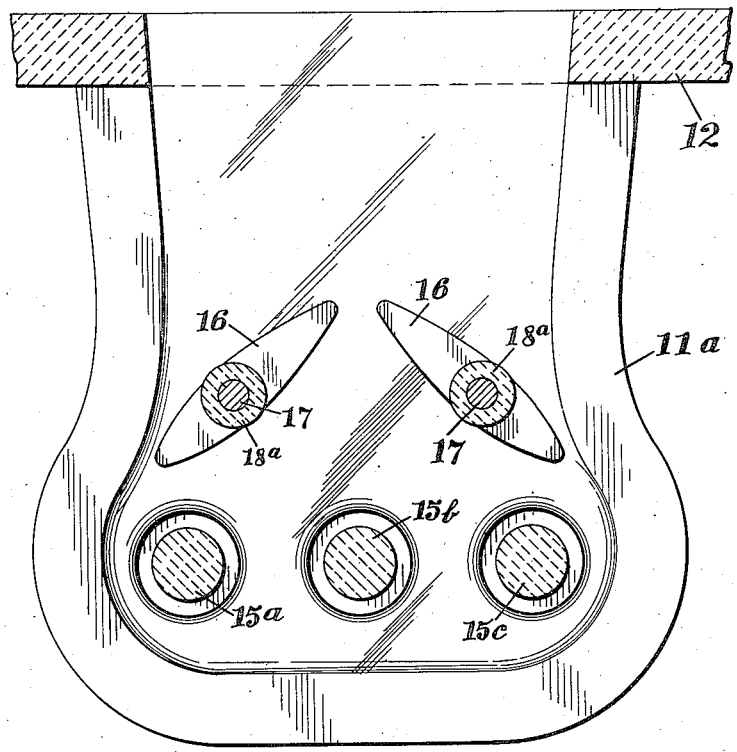
Figure 5 is a sectional plan view of a modified form of feeder in which a plurality of discharge outlets are provided.

Figure 5 shows a modified construction in which a plurality of outlet openings are provided in the boot 11ª, said openings being controlled by regulators 15ª, 15ᵇ, and 15ᶜ. The guides 16 are adjustable to regulate the relative amount of glass directed to the respective outlets.

Modifications may be resorted to within the spirit and scope of my invention.

What I claim is:

1. In mechanism for delivering molten glass, the combination of a container for the glass having a discharge outlet, guiding means for directing glass moving toward the outlet, and means for adjusting said guiding means.

2. In mechanism for delivering molten glass, the combination of a container for the glass having a discharge outlet, a guide in the glass flowing toward the outlet, and means to adjust said guide laterally.

3. In mechanism for delivering molten glass, the combination of a container for the glass having a discharge outlet, a guide projecting downwardly into the glass, and means to adjust said guide vertically and laterally.

4. The combination of a container for molten glass having a discharge opening in the bottom thereof, means for supplying glass to said container and causing it to flow through said container to the outlet, a guide in said container at one side of the outlet, and means for adjusting said guide laterally.

5. The combination of a container for molten glass having a discharge opening in the bottom thereof, means for supplying glass to said container and causing it to flow through said container to the outlet, a guide in said container at one side of the outlet, and means for adjusting said guide up and down in the glass.

6. The combination of a container for molten glass having a discharge opening in the bottom thereof, means for supplying glass to said container and causing it to flow through said container to the outlet, a guide in said container at one side of the outlet, and means for rotatively adjusting said guide about a vertical axis.

7. The combination of a container for molten glass having an outlet opening in the bottom thereof, a pair of guides in the glass at one side of the opening, and means for adjusting said guides.

8. The combination of a container for molten glass having an outlet opening in the bottom thereof, a pair of guides in the glass at one side of the opening, and means for adjusting the ends of said guides toward and from each other.

9. The combination of a container for molten glass having an outlet opening, guides projecting downward into the glass in said container, vertical stems by which said guides are carried, and means for rotatively adjusting said stems and thereby adjusting the guides.

10. The combination of a container for molten glass having an outlet opening, guides projecting downward into the glass in said container, vertical stems by which said guides are carried, and adjusting means for independently rotating said stems and thereby independently adjusting the guides.

11. The combination of a container for molten glass having an outlet opening, guides projecting downward into the glass in said container, separate means for individually adjusting the guides up and down, and means for simultaneously adjusting the guides up and down as a unit.

12. The combination of a furnace boot having a discharge opening, wing guides projecting downward into the glass in the boot, vertical stems by which said wings are carried, supporting frames in which said stems are journalled, adjusting means carried by said frames for independently rotating said stems and thereby independently adjusting the wings rotatively, a yoke on which said frames are mounted, adjusting means for independently adjusting said frames up and down on the yoke, and means for adjusting said yoke up and down.

13. The combination with a furnace, of a boot or extension thereon, said boot having an outlet orifice in its floor at the forward end of the boot, a regulator projecting downward into the glass over said outlet, and a pair of wing guides projecting downward into the glass between said regulator and the furnace.

14. The combination with a furnace, of a boot or extension thereon, said boot having an outlet orifice in its floor at the forward end of the boot, a regulator projecting downward into the glass over said outlet, a pair of wing guides projecting downward into the glass between said regulator and the furnace, and means to laterally adjust said wings.

15. The combination with a furnace, of a boot or extension thereon, said boot having an outlet orifice in its floor at the forward end of the boot, a regulator projecting downward into the glass over said outlet, a pair of wing guides projecting downward into the glass between said regulator and the furnace, and means to rotatively adjust said wings about vertical axes.

16. The combination with a furnace, of a boot or extension thereon, said boot having an outlet orifice in its floor at the forward end of the boot, a regulator projecting downward into the glass over said outlet, a pair of wing guides projecting downward into the glass between said regulator and the furnace, means to laterally adjust said wings, and means to adjust said wings up and down in the glass.

Signed at Toledo, in the county of Lucas and State of Ohio, this 28th day of Sept., 1922.

LEONARD D. SOUBIER.